US009984825B2

(12) United States Patent
Park et al.

(10) Patent No.: US 9,984,825 B2
(45) Date of Patent: May 29, 2018

(54) DIELECTRIC CERAMIC COMPOSITION, DIELECTRIC MATERIAL, AND MULTILAYER CERAMIC CAPACITOR CONTAINING THE SAME

(71) Applicant: SAMSUNG ELECTRO-MECHANICS CO., LTD., Suwon-si, Gyeonggi-do (KR)

(72) Inventors: Yun Jung Park, Suwon-si (KR); Seok Hyun Yoon, Suwon-si (KR); Hyoung Uk Kim, Suwon-si (KR); Chang Hoon Kim, Suwon-si (KR); Doo Young Kim, Suwon-si (KR)

(73) Assignee: SAMSUNG ELECTRO-MECHANICS CO., LTD., Suwon-si, Gyeonggi-Do (KR)

( * ) Notice: Subject to any disclaimer, the term of this patent is extended or adjusted under 35 U.S.C. 154(b) by 0 days. days.

(21) Appl. No.: 15/229,641

(22) Filed: Aug. 5, 2016

(65) Prior Publication Data

US 2017/0186543 A1   Jun. 29, 2017

(30) Foreign Application Priority Data

Dec. 24, 2015 (KR) .................. 10-2015-0186420

(51) Int. Cl.
*C04B 35/626* (2006.01)
*H01G 4/30* (2006.01)
(Continued)

(52) U.S. Cl.
CPC .............. *H01G 4/30* (2013.01); *B32B 18/00* (2013.01); *C04B 35/4682* (2013.01);
(Continued)

(58) Field of Classification Search
CPC .................. C04B 35/468; C04B 35/4682; H01G 4/1227; H01G 4/1218; H01G 4/1209
See application file for complete search history.

(56) References Cited

U.S. PATENT DOCUMENTS 7,057,876 B2 *  6/2006  Fujioka ................. B32B 18/00
                                                  361/321.4
7,706,125 B2 *  4/2010  Fukuda ................ H01G 4/1227
                                                  29/25.42
(Continued)

FOREIGN PATENT DOCUMENTS

JP       2009-238885 A    10/2009
JP       2011-176186 A     9/2011
(Continued)

OTHER PUBLICATIONS

Office Action dated May 1, 2017, issued in Korean Patent Application No. 10-2015-0186420. (w/ partial English translation).

*Primary Examiner* — Noah S Wiese
(74) *Attorney, Agent, or Firm* — McDermott Will & Emery LLP

(57) ABSTRACT

A dielectric material includes a barium titanate based base material main ingredient and an accessory ingredient. In a fine sintered structure of the dielectric material, crystal grains in which a content of Ca is less than 2.5 mol % are first crystal grains, crystal grains in which the content of Ca is 4.0 to 12.0 mol % are second crystal grains, and a ratio of an average size of the first crystal grains to an average size of the second crystal grains is in a range of 1.6 to 2.2.

33 Claims, 2 Drawing Sheets

(51) Int. Cl.
  *H01G 4/12* (2006.01)
  *C04B 35/468* (2006.01)
  *B32B 18/00* (2006.01)

(52) U.S. Cl.
  CPC .... *C04B 35/6261* (2013.01); *C04B 35/62685* (2013.01); *H01G 4/1209* (2013.01); *H01G 4/1227* (2013.01); *C04B 2235/3208* (2013.01); *C04B 2235/3215* (2013.01); *C04B 2235/3225* (2013.01); *C04B 2235/3239* (2013.01); *C04B 2235/3248* (2013.01); *C04B 2235/3267* (2013.01); *C04B 2235/3418* (2013.01); *C04B 2235/36* (2013.01); *C04B 2235/442* (2013.01); *C04B 2235/6025* (2013.01); *C04B 2235/783* (2013.01); *C04B 2235/785* (2013.01); *C04B 2237/346* (2013.01); *C04B 2237/68* (2013.01); *C04B 2237/704* (2013.01)

(56) References Cited

U.S. PATENT DOCUMENTS

| | | | |
|---|---|---|---|
| 8,154,851 B2* | 4/2012 | Fukuda | C04B 35/4682 361/321.4 |
| 8,184,427 B2* | 5/2012 | Yamazaki | B32B 18/00 361/321.4 |
| 8,208,240 B2* | 6/2012 | Yamazaki | H01G 4/1227 361/321.4 |
| 2010/0067171 A1 | 3/2010 | Yamazaki et al. | |
| 2015/0299048 A1 | 10/2015 | Yoon et al. | |

FOREIGN PATENT DOCUMENTS

| | | |
|---|---|---|
| KR | 1999-0075846 A | 10/1999 |
| KR | 2009-0060454 A | 6/2009 |
| KR | 2015-0121569 A | 10/2015 |

* cited by examiner

DIELECTRIC CERAMIC COMPOSITION, DIELECTRIC MATERIAL, AND MULTILAYER CERAMIC CAPACITOR CONTAINING THE SAME

CROSS-REFERENCE TO RELATED APPLICATION

This application claims benefit of priority to Korean Patent Application No. 10-2015-0186420, filed on Dec. 24, 2015 with the Korean Intellectual Property Office, the disclosure of which is incorporated herein by reference.

TECHNICAL FIELD

The present disclosure relates to a dielectric ceramic composition and a dielectric material capable of ensuring X8R temperature characteristics and reliability, and a multilayer ceramic capacitor containing the same.

BACKGROUND

Electronic components using ceramic material, such as capacitors, inductors, piezoelectric elements, varistors, thermistors, or the like, include a ceramic body formed of ceramic material, internal electrodes formed in the ceramic body, and external electrodes mounted on a surface of the ceramic body so as to be connected to the internal electrodes.

Among ceramic electronic components, a multilayer ceramic capacitor includes a plurality of stacked dielectric layers, internal electrodes disposed to face each other with each of the dielectric layers interposed therebetween, and external electrodes electrically connected to the internal electrodes.

In general, a multilayer ceramic capacitor is manufactured by stacking a paste for an internal electrode and a paste for a dielectric layer using a sheet method, a printing method, or the like, and simultaneously sintering the stacked pastes.

A dielectric material used in a high-capacitance multilayer ceramic capacitor according to the related art, or the like, which is a barium titanate ($BaTiO_3$)-based ferroelectric material, has high permittivity at room temperature, a relatively low dissipation factor, and excellent insulation resistance characteristics.

However, a barium titanate ($BaTiO_3$)-based dielectric material has problems in satisfying X8R characteristics, which are capacitance temperature characteristics at a temperature of up to 150° C., and ensuring reliability.

SUMMARY

An aspect of the present disclosure may provide a novel dielectric ceramic composition and a dielectric material capable of ensuring X8R temperature characteristics and reliability, and a multilayer ceramic capacitor containing the same.

According to an aspect of the present disclosure, there are provided a dielectric ceramic composition containing: a barium titanate based base material main ingredient and an accessory ingredient, wherein in a fine structure after sintering, crystal grains in which a content of Ca is less than 2.5 mol % are first crystal grains, crystal grains in which the content of Ca is 4.0 to 12.0 mol % are second crystal grains, and a ratio of an average size of the first crystal grains after sintering to an average size of the second crystal grains after sintering is in a range of 1.6 to 2.2, and a dielectric material formed by sintering the dielectric ceramic composition.

According to another aspect of the present disclosure, a multilayer ceramic capacitor may include: a ceramic body in which dielectric layers and internal electrodes are alternately stacked; and first and second external electrodes formed on an outer surface of the ceramic body and electrically connected to first and second internal electrodes, wherein in a fine structure of the dielectric layer, crystal grains in which a content of Ca is less than 2.5 mol % are first crystal grains, crystal grains in which the content of Ca is 4.0 to 12.0 mol % are second crystal grains, and a ratio of an average size of the first crystal grains after sintering to an average size of the second crystal grains after sintering is in a range of 1.6 to 2.2.

According to another aspect of the present disclosure, a dielectric ceramic composition may include a base material main ingredient power including $(Ba_{1-x}Ca_x)TiO_3$ (x≤0.02) powder and $(Ba_{1-y}Ca_y)TiO_3$ (0.04≤y≤0.12) powder and an accessory ingredient. The accessory ingredient may include a first accessory ingredient containing one or more selected from the group consisting of oxides and carbonates of one or more variable-valence acceptor elements among Mn, V, Cr, Fe, Ni, Co, Cu, and Zn, a second accessory ingredient containing one or more of oxides and carbonates of fixed-valence acceptor elements including Mg, a third accessory ingredient containing one or more selected from the group consisting of oxides and carbonates of one or more elements among Y, Dy, Ho, Sm, Gd, Er, La, Ce, and Nd, a fourth accessory ingredient containing one or more selected from the group consisting of oxides and carbonates of one or more elements of Ba and Ca, a fifth accessory ingredient containing $CaZrO_3$, and a sixth accessory ingredient containing one or more selected from the group consisting of oxides of Si, carbonates of Si, and glass containing Si.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Figure 1:
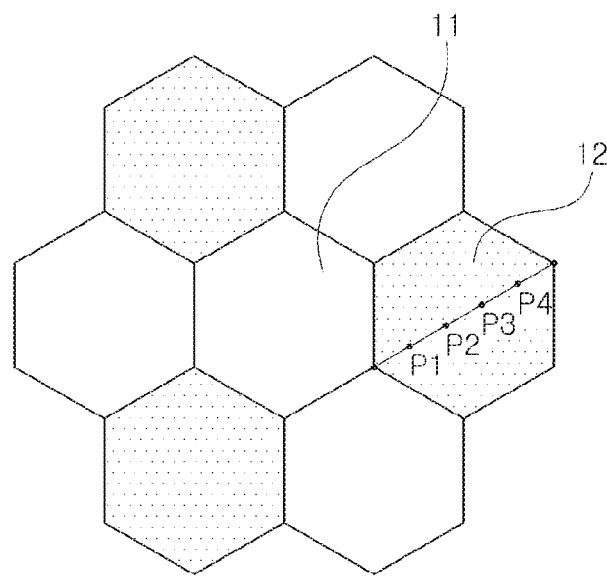
FIG. 1 is a schematic view illustrating a fine structure of a dielectric ceramic composition according to an exemplary embodiment in the present disclosure after sintering.

Hereinafter, embodiments of the present inventive concept will be described as follows with reference to the attached drawings.

The present inventive concept may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

Throughout the specification, it will be understood that when an element, such as a layer, region or wafer (substrate), is referred to as being "on," "connected to," or "coupled to" another element, it can be directly "on," "connected to," or "coupled to" the other element or other elements intervening therebetween may be present. In contrast, when an element is referred to as being "directly on," "directly connected to," or "directly coupled to" another element, there may be no elements or layers intervening therebetween. Like numerals refer to like elements throughout. As used herein, the term "and/or" includes any and all combinations of one or more of the associated listed items.

It will be apparent that though the terms first, second, third, etc. may be used herein to describe various members, components, regions, layers and/or sections, these members, components, regions, layers and/or sections should not be limited by these terms. These terms are only used to distinguish one member, component, region, layer or section from another region, layer or section. Thus, a first member, component, region, layer or section discussed below could be termed a second member, component, region, layer or section without departing from the teachings of the exemplary embodiments.

Spatially relative terms, such as "above," "upper," "below," and "lower" and the like, may be used herein for ease of description to describe one element's relationship to another element(s) as shown in the figures. It will be understood that the spatially relative terms are intended to encompass different orientations of the device in use or operation in addition to the orientation depicted in the figures. For example, if the device in the figures is turned over, elements described as "above," or "upper" other elements would then be oriented "below," or "lower" the other elements or features. Thus, the term "above" can encompass both the above and below orientations depending on a particular direction of the figures. The device may be otherwise oriented (rotated 90 degrees or at other orientations) and the spatially relative descriptors used herein may be interpreted accordingly.

The terminology used herein is for describing particular embodiments only and is not intended to be limiting of the present inventive concept. As used herein, the singular forms "a," "an," and "the" are intended to include the plural forms as well, unless the context clearly indicates otherwise. It will be further understood that the terms "comprises," and/or "comprising" when used in this specification, specify the presence of stated features, integers, steps, operations, members, elements, and/or groups thereof, but do not preclude the presence or addition of one or more other features, integers, steps, operations, members, elements, and/or groups thereof.

Hereinafter, embodiments of the present inventive concept will be described with reference to schematic views illustrating embodiments of the present inventive concept. In the drawings, for example, due to manufacturing techniques and/or tolerances, modifications of the shape shown may be estimated. Thus, embodiments of the present inventive concept should not be construed as being limited to the particular shapes of regions shown herein, for example, to include a change in shape results in manufacturing. The following embodiments may also be constituted by one or a combination thereof.

The contents of the present inventive concept described below may have a variety of configurations and propose only a required configuration herein, but are not limited thereto.

The present disclosure relates to a dielectric ceramic composition. Examples of electronic components containing the dielectric ceramic composition include capacitors, inductors, piezoelectric elements, varistors, thermistors, or the like. Hereinafter, the dielectric ceramic composition and a multilayer ceramic capacitor as an example of the electronic component will be described.

A dielectric ceramic composition according to an exemplary embodiment in the present disclosure may contain a base material main ingredient and an accessory ingredient, wherein in a fine structure after sintering, crystal grains in which a content of Ca is less than 2.5 mol % are first crystal grains, crystal grains in which the content of Ca is 4.0 to 12.0 mol % are second crystal grains, and a ratio of an average size of the first crystal grains after sintering to an average size of the second crystal grains after sintering is in a range of 1.6 to 2.2.

The base material main ingredient is a barium titanate based compound containing Ba and Ti.

The dielectric ceramic composition according to the exemplary embodiment in the present disclosure may satisfy X5R (−55° C. −85° C.), X7R (−55° C. −125° C.), and X8R (−55° C. −150° C.) characteristics of the Electronic Industries Association (EIA) standard.

According to the exemplary embodiment, a dielectric ceramic composition capable of using nickel (Ni) as an internal electrode and being sintered at 1300° C. or less under a reduction atmosphere at which nickel (Ni) is not oxidized may be provided.

Further, according to the exemplary embodiment, a dielectric material formed by sintering the dielectric ceramic composition and a multilayer ceramic capacitor using the dielectric ceramic composition may be provided.

The multilayer ceramic capacitor according to the exemplary embodiment may satisfy the temperature characteristics and improve reliability due to an excellent filling degree between the crystal grains.

That is, according to the exemplary embodiment, when in the fine structure of the dielectric ceramic composition after sintering, the crystal grains in which the content of Ca is less than 2.5 mol % are defined as the first crystal grains, and the crystal grains in which the content of Ca is 4.0 to 12.0 mol % are defined as the second crystal grains, the ratio of the average size of the first crystal grains after sintering to the average size of the second crystal grains after sintering may be adjusted to be in a range of 1.6 to 2.2, and thus the temperature characteristics may be satisfied, and reliability may be improved due to the excellent filling degree between the crystal grains.

In a case in which the ratio of the average size of the first crystal grains after sintering to the average size of the second crystal grains after sintering is less than 1.6, a pore fraction at a triple point where three crystal grains meet among the crystal grains may be increased.

In a case in which the ratio of the average size of the first crystal grains after sintering to the average size of the second crystal grains after sintering is more than 2.2, the pore fraction at the triple point where three crystal grains meet among the crystal grains may be increased.

FIG. 1 is a schematic illustrating the fine structure of the dielectric ceramic composition according to an exemplary embodiment in the present disclosure after sintering.

The dielectric material formed by sintering the dielectric ceramic composition according to the exemplary embodiment may contain a plurality of dielectric grains as illustrated in FIG. 1.

Referring to FIG. 1, when in the fine structure of the dielectric ceramic composition after sintering, crystal grains in which the content of Ca is less than 2.5 mol % are defined as first crystal grains 11, and crystal grains in which the content of Ca is 4.0 to 12.0 mol % are defined as second crystal grains 12, the content of Ca in the crystal grain may be measured by scanning transmission electron microscopy-energy-dispersive x-ray spectroscopy (STEM-EDS) analysis.

In a sintered material of the dielectric ceramic composition according to the exemplary embodiment, the content of Ca in a single crystal grain may be determined as an average value of values measured at points P1, P2, P3, and P4 of each of the crystal grains as illustrated in FIG. 1.

The points P1, P2, P3, and P4 may be defined as points corresponding to 1/5, 2/5, 3/5, and 4/5 of a straight line crossing each of the crystal grains.

According to the exemplary embodiment, an area ratio of the pore at the triple point where three crystal grains meet among the crystal grains may be equal to or less than 20% of an entire area of the crystal grains.

The area ratio of the pore at the triple point where three crystal grains meet among the crystal grains may be obtained by measuring a size of the pore at the triple point of the sintered material, multiplying the total number of triple points, and calculating a ratio to the entire area of the crystal grains, and thus a filling degree of the crystal grain may be confirmed.

According to the exemplary embodiment, the area ratio of the pore at the triple point where three crystal grains meet among the crystal grains may be equal to or less than 20% of the entire area of the crystal grains, and thus the filling degree may be high, the X8R temperature characteristics may be satisfied, and excellent high-temperature withstand voltage characteristics may be implemented.

In a case in which the area ratio of the pore at the triple point where three crystal grains meet among the crystal grains is equal to or more than 20% of the entire area of the crystal grains, compactness of the crystal grain may be low, and thus high-temperature withstand voltage characteristics may be deteriorated.

In a case of using Ca-doped barium titanate (BCT) as a base material powder in order to implement high-temperature characteristics, a temperature coefficient of capacitance (TCC) at a high temperature may be improved, but a change in permittivity depending on an AC electric field may be high, and side effects such as a decrease in room-temperature RC value, an increase in dissipation factor (DF), and the like, may occur.

However, according to the exemplary embodiment, a dielectric ceramic composition capable of decreasing the occurrence of side effects while implementing high-temperature characteristics (X8R characteristics) and excellent reliability may be provided by mixing first and second base material main ingredients containing different contents of Ca with each other at a suitable ratio, and adjusting a composition of an accessory ingredient additive.

Further, in a case of adding $CaZrO_3$ and an excessive amount of a rare earth element to $BaTiO_3$ in order to satisfy high-temperature characteristics (X8R characteristics), even if the high-temperature characteristics are implemented, since a Curie temperature of the base material itself is 125° C., there is a limitation in improving temperature coefficient of capacitance (TCC) characteristics at a high temperature.

However, according to the exemplary embodiment, the high-temperature characteristics (X8R characteristics) may be satisfied, and excellent temperature coefficient of capacitance (TCC) at a high temperature may be implemented by controlling contents of the first and second base material main ingredients.

Further, a generation frequency of the pore at the triple point where three crystal grains meet among the crystal grains may be decreased by increasing a sintering property using base materials of which sizes of crystal grains are different from each other, and thus reliability may be improved.

Therefore, the multilayer ceramic capacitor using the dielectric ceramic composition according to the exemplary embodiment may satisfy the high-temperature characteristics (X8R characteristics) and implement excellent temperature coefficient of capacitance (TCC) characteristics at a high temperature.

The dielectric ceramic composition according to the exemplary embodiment may contain the base material main ingredient and the accessory ingredient, wherein the accessory ingredient may include first to sixth accessory ingredients.

Hereinafter, each of the ingredients of the dielectric ceramic composition according to the exemplary embodiment in the present disclosure will be described in detail.

a) Base Material Main Ingredient

The dielectric ceramic composition according to the exemplary embodiment may contain a base material main ingredient containing Ba and Ti.

According to the exemplary embodiment, the base material main ingredient may include a first base material main ingredient represented by $(Ba_{1-x}Ca_x)TiO_3$ (x≤0.02) and a second base material main ingredient represented by $(Ba_{1-y}Ca_y)TiO_3$ (0.04≤y≤0.12).

Here, x may be 0 or more, and in a case in which x is 0, the first base material main ingredient may be $BaTiO_3$.

The base material main ingredient may be contained in a powder form. That is, the first base material main ingredient may be contained in the dielectric ceramic composition as a first base material powder, and the second base material main ingredient may be contained in the dielectric ceramic composition as a second base material powder.

The first base material powder may be composed of first crystal grains having an average size of 200 to 450 nm after sintering, and the second base material powder may be composed of second crystal grains having an average size of 120 to 350 nm after sintering.

According to the exemplary embodiment, an area of the crystal grains satisfying the condition that the ratio of the average size of the first crystal grain after sintering to the average size of the second crystal grain after sintering is in a range of 1.6 to 2.2 may be 80% or more of the entire area (100%) of the crystal grains.

In a case of excessively adding $CaZrO_3$ and the rare earth element to the $BaTiO_3$ base material, even if the X8R temperature characteristics are implemented, since a Curie temperature of the base material itself is about 125° C., there is a limitation in improving temperature coefficient of capacitance (TCC) characteristics at a high temperature, and reliability may be deteriorated due to formation of a pyrochlore secondary phase caused by an excessively added rare earth element.

However, in a case of implementing a mixed fine structure composed of the first and second crystal grains by adding the accessory ingredient additive to a mixed base material of the first and second base material main ingredients according to the exemplary embodiment, excellent TCC characteristics at a high temperature may be implemented as compared to a case of adding $CaZrO_3$ or an excessive amount of the rare earth element to the $BaTiO_3$ base material.

Further, in the case of implementing the mixed fine structure composed of the first and second crystal grains by adding the accessory ingredient additive to the mixed base material of the first and second base material main ingredients according to the exemplary embodiment, low DF and high insulation resistance characteristics may be implemented as compared to a case of using only a BCT base material.

b) First Accessory Ingredient

According to the exemplary embodiment, the dielectric ceramic composition may contain one or more elements selected from the group consisting of Mn, V, Cr, Fe, Ni, Co, Cu, and Zn, oxides thereof, and carbonates thereof as the first accessory ingredient.

The first accessory ingredient may be contained in a content of 0.1 to 2.0 parts by mole, based on 100 parts by mole of the base material main ingredient, in the dielectric ceramic composition.

The content of the first accessory ingredient may be based on a content of one or more elements among Mn, V, Cr, Fe, Ni, Co, Cu, and Zn contained in the first accessory ingredient, regardless of the form of addition such as that of oxide or carbonate.

For example, a sum of contents of one or more variable-valence acceptor elements among Mn, V, Cr, Fe, Ni, Co, Cu, and Zn contained in the first accessory ingredient may be 0.1 to 2.0 parts by mole, based on 100 parts by mole of the base material main ingredient.

The first accessory ingredient may serve to improve reduction resistance of the dielectric ceramic composition and high-temperature withstand voltage characteristics of a multilayer ceramic capacitor using the dielectric ceramic composition.

The content of the first accessory ingredient and contents of the second to fourth and sixth accessory ingredients to be described below, which are relative contents based on 100 parts by mole of the base material main ingredient, may be particularly defined as part by mole of a metal or metalloid (Si) contained in each accessory ingredient. Part by mole of the metal or metalloid may include a part by mole of an ionic metal or metalloid.

In a case in which the content of the first accessory ingredient is 0.1 to 2.0 parts by mole, based on 100 parts by mole of the base material main ingredient, a dielectric ceramic composition capable of having excellent high-temperature withstand voltage characteristics while securing a RC value may be provided.

In a case in which the content of the first accessory ingredient is less than 0.1 parts by mole, the RC value may be significantly low, or a high-temperature withstand voltage may be decreased.

In a case in which the content of the first accessory ingredient is more than 2.0 parts by mole, the RC value may be decreased.

The dielectric ceramic composition according to the exemplary embodiment may contain 0.1 to 2.0 parts by mole of the first accessory ingredient, based on 100 parts by mole of the base material powder, and accordingly, the dielectric ceramic composition may be sintered at a low temperature and obtain high high-temperature withstand voltage characteristics.

c) Second Accessory Ingredient

According to the exemplary embodiment, the dielectric ceramic composition may contain one or more of oxides and carbonates of fixed-valence acceptor elements including Mg as the second accessory ingredient.

The second accessory ingredient may be contained in a content of 2.0 parts by mole or less, based on 100 parts by mole of the base material main ingredient.

The content of the second accessory ingredient may be based on a content of Mg contained in the second accessory ingredient, regardless of the form of addition such as that of oxide or carbonate.

For example, the content of Mg contained in the second accessory ingredient may be 2.0 parts by mole or less, based on 100 parts by mole of the base material main ingredient.

In a case in which the content of the second accessory ingredient is more than 2.0 parts by mole, based on 100 parts by mole of the base material main ingredient of the dielectric material, permittivity may be decreased, and high-temperature withstand voltage characteristics may be deteriorated.

d) Third Accessory Ingredient

According to the exemplary embodiment in the present disclosure, the dielectric ceramic composition may contain a third accessory ingredient containing one or more selected from the group consisting of oxides and carbonates of one or more elements among Y, Dy, Ho, Sm, Gd, Er, La, Ce, and Nd.

The third accessory ingredient may be contained in a content of 0.2 to 5.0 parts by mole, based on 100 parts by mole of the base material main ingredient.

The content of the third accessory ingredient may be based on a content of one or more elements among Y, Dy, Ho, Sm, Gd, Er, La, Ce, and Nd contained in the third accessory ingredient, regardless of the form of addition such as that of oxide or carbonate.

For example, a sum of contents of one or more elements among Y, Dy, Ho, Sm, Gd, Er, La, Ce, and Nd contained in the third accessory ingredient may be 0.2 to 5.0 parts by mole, based on 100 parts by mole of the base material main ingredient.

According to the exemplary embodiment, the third accessory ingredient may serve to prevent reliability of the multilayer ceramic capacitor using the dielectric ceramic composition from being deteriorated.

More specifically, when a peak intensity of a (110) plane of the $BaTiO_3$ crystalline phase in X-ray diffraction (XRD) measurement of the sintered dielectric material is considered as 1.00, a peak intensity of pyrochlore ($RE_2Ti_2O_7$) (here, RE is at least one element among Y, Dy, Ho, Sm, Gd, Er, La, Ce, and Nd) secondary phase in the vicinity of 30.5 degrees may be 0.02 or less by adjusting the content of the third accessory ingredient.

In a case in which the content of the third accessory ingredient is less than 0.2 parts by mole, based on 100 parts by mole of the base material main ingredient, an effect of improving TCC at a high temperature may be insufficient, and in a case in which the content of the third accessory ingredient is more than 5.0 parts by mole, based on 100 parts by mole of the base material main ingredient, the high-temperature withstand voltage characteristics may be deteriorated due to formation of the pyrochlore ($RE_2Ti_2O_7$) (here, RE is at least one element among Y, Dy, Ho, Sm, Gd, Er, La, Ce, and Nd) secondary phase.

e) Fourth Accessory Ingredient

According to the exemplary embodiment, the dielectric ceramic composition may contain a fourth accessory ingredient containing one or more selected from the group consisting of oxides and carbonates of one or more elements of Ba and Ca.

The fourth accessory ingredient may be contained in a content of 0.72 to 7.68 parts by mole, based on 100 parts by mole of the base material main ingredient.

The content of the fourth accessory ingredient may be based on a content of one or more elements of Ba and Ca contained in the fourth accessory ingredient, regardless of the form of addition such as that of oxide or carbonate.

For example, a sum of content of one or more elements of Ba and Ca contained in the fourth accessory ingredient may be 0.72 to 7.68 parts by mole, based on 100 parts by mole of the base material main ingredient.

In a case in which 0.72 to 7.68 parts by mole of the fourth accessory ingredient is contained, based on 100 parts by mole of the base material main ingredient, the high-temperature withstand voltage characteristics may be improved.

f) Fifth Accessory Ingredient

According to the exemplary embodiment, the dielectric ceramic composition may contain a fifth accessory ingredient containing $CaZrO_3$.

$CaZrO_3$ may be contained in a content (based on Ca and Zr) of 3 parts by mole or less, based on 100 parts by mole of the base material main ingredient.

In a case in which the content (based on Ca and Zr) of the fifth accessory ingredient ($CaZrO_3$) is more than 3 parts by mole, based on 100 parts by mole of the base material main ingredient of the dielectric material, the dielectric ceramic composition may not satisfy TCC standard at a low temperature (−55° C.)

g) Sixth Accessory Ingredient

According to the exemplary embodiment, the dielectric ceramic composition may contain a sixth accessory ingredient containing one or more selected from the group consisting of oxides of Si, carbonates of Si, and glass containing Si.

The sixth accessory ingredient may be contained in a content of 0.5 to 3.0 parts by mole, based on 100 parts by mole of the base material main ingredient.

The content of the sixth accessory ingredient may be based on a content of Si contained in the sixth accessory ingredient, regardless of the form of addition such as that of glass, oxide, or carbonate.

In a case in which the content of the sixth accessory ingredient is less than 0.5 parts by mole, based on 100 parts by mole of the base material main ingredient of the dielectric material, permittivity and high-temperature withstand voltage characteristics may be deteriorated, and in a case in which the content of the sixth accessory ingredient is more than 3.0 parts by mole, problems such as deterioration of the sintering property and compactness, a secondary phase formation, and the like, may occur.

Figure 2:
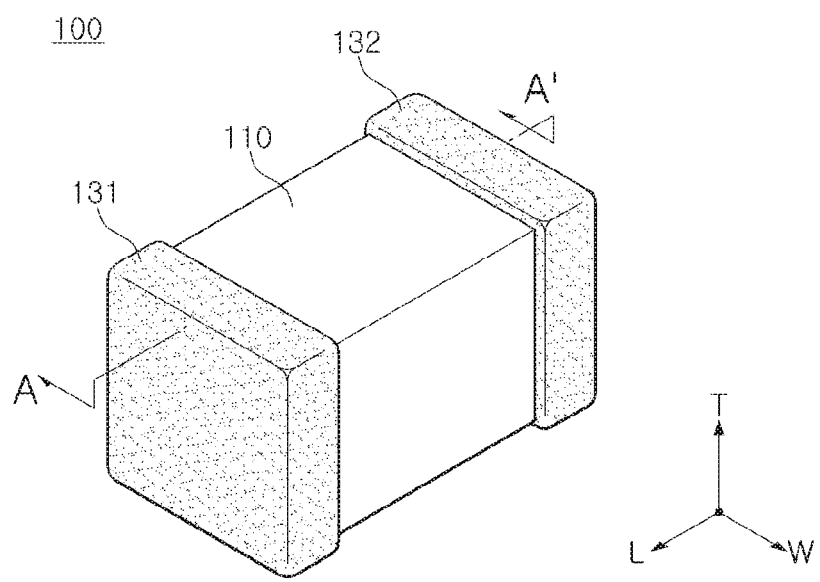
FIG. 2 is a schematic perspective view illustrating a multilayer ceramic capacitor according to another exemplary embodiment in the present disclosure.
Figure 3:
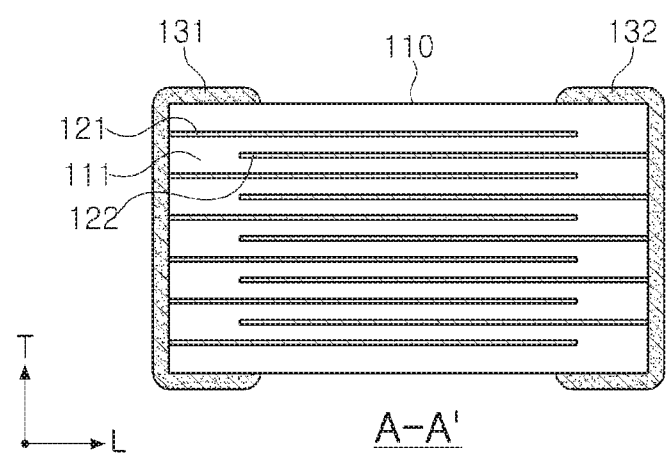
FIG. 3 is a schematic cross-sectional view illustrating the multilayer ceramic capacitor, taken along line A-A' of FIG. 2.

FIG. 2 is a schematic perspective view illustrating a multilayer ceramic capacitor according to another exemplary embodiment in the present disclosure, and FIG. 3 is a schematic cross-sectional view illustrating the multilayer ceramic capacitor, taken along line A-A' of FIG. 2.

Referring to FIGS. 2 and 3, the multilayer ceramic capacitor 100 according to another exemplary embodiment may include a ceramic body 110 in which dielectric layers 111 and internal electrodes 121 and 122 are alternately stacked. First and second external electrodes 131 and 132 electrically connected to the first and second internal electrodes 121 and 122 alternately disposed in the ceramic body 110, respectively, may be formed on both end portions of the ceramic body 110.

A shape of the ceramic body 110 is not particularly limited, but may generally be a hexahedral shape. In addition, a dimension of the ceramic body 110 is not particularly limited, and the ceramic body may have a suitable dimension depending on the use. For example, the ceramic body may have a dimension of (0.6–5.6 mm)×(0.3–5.0 mm)×(0.3–1.9 mm).

A thickness of the dielectric layer 111 may be optionally changed according to capacitance design of the capacitor. According to the exemplary embodiment, a thickness of a single dielectric layer after sintering may preferably be 0.1 µm or more.

In a case in which the dielectric layer has an excessively reduced thickness, the number of crystal grains existing in the single dielectric layer is small, which has a negative influence on reliability. Therefore, the thickness of the dielectric layer may be 0.1 µm or more.

The first and second internal electrodes 121 and 122 may be stacked so that end surfaces thereof are exposed to both end portions of the ceramic body 110 opposing each other, respectively.

The first and second external electrodes 131 and 132 may be formed on both end portions of the ceramic body 110 and electrically connected to the exposed end surfaces of the first and second internal electrodes 121 and 122, thereby configuring a capacitor circuit.

A conductive material contained in the first and second internal electrodes 121 and 122 is not particularly limited, but may preferably be nickel (Ni).

A thickness of the first and second internal electrodes 121 and 122 may be appropriately determined depending on the use, or the like, but is not particularly limited. For example, the thickness may be 0.1 µm to 5 µm or 0.1 µm to 2.5 µm.

A conductive material contained in the first and second external electrodes 131 and 132 is not particularly limited, but nickel (Ni), copper (Cu), or an alloy thereof may be used.

The dielectric layer 111 configuring the ceramic body 110 may contain the dielectric ceramic composition according to the exemplary embodiment.

The dielectric layer 111 configuring the ceramic body 110 may be formed by sintering the dielectric ceramic composition according to the exemplary embodiment.

The dielectric ceramic composition may contain a barium titanate based base material main ingredient and an accessory ingredient, wherein in a fine structure after sintering, crystal grains in which a content of Ca is less than 2.5 mol % are defined as first crystal grains, crystal grains in which the content of Ca is 4.0 to 12.0 mol % are defined as second crystal grains, and a ratio of an average size of the first crystal grains after sintering to an average size of the second crystal grains after sintering is in a range of 1.6 to 2.2.

In addition, an area of the crystal grains satisfying the condition that the ratio of the average size of the first crystal grain after sintering to the average size of the second crystal grain after sintering is in a range of 1.6 to 2.2 may be 80% or more of the entire area (100%) of the crystal grains.

Since other features of the dielectric ceramic composition are the same as those of the dielectric ceramic composition according to the exemplary embodiment described above, a detailed description thereof will be omitted.

Hereinafter, the present disclosure will be described in more detail through Experimental Examples, and the purpose of the Experimental Examples is to help the specific understanding of the present disclosure. Therefore, the scope of the present disclosure is not limited thereto.

Experimental Example

A mixed solid-solution powder of (1-z) $(Ba_{1-x}Ca_x)TiO_3$ and $z(Ba_{1-y}Ca_y)TiO_3$, which is base material powder containing first and second base material main ingredients, was prepared using a solid phase method as described below.

Starting materials were $BaCO_3$, $TiO_2$, and $CaCO_3$. These starting material powders were mixed with each other using a ball mill and calcined at 900° C. to 1000° C., thereby preparing $(Ba_{1-x}Ca_x)TiO_3$ powder (first base material powder) having an average particle size of 300 nm and $(Ba_{1-y}Ca_y)TiO_3$ powder (x<y) (second base material powder). After accessory ingredient additive powders having composition ratios illustrated in Table 1 were added to the prepared base material main ingredient powder, the raw material powder containing the main ingredient and the accessory ingredients was mixed with a dispersant, and a binder using ethanol and toluene as solvents using zirconia balls as mixing/dispersing media and then ball-milled for 20 hours.

A forming sheet having a thickness of 10 μm was manufactured from the prepared slurry using a doctor blade type coater. A nickel (Ni) internal electrode was printed on the forming sheet. Upper and lower covers were manufactured by stacking 25 cover sheets, and 21 active sheets on which the Ni internal electrode was printed were stacked while being compressed, thereby manufacturing a compressed bar. The compressed bar was cut into chips having a 3216 size (length×width×thickness: 3.2 mm×1.6 mm×1.6 mm) using a cutter.

After the cut chip was calcined and sintered at 1200° C. to 1250° C. for 2 hours under a reduction atmosphere (0.1% of $H_2$/99.9% of $N_2$, $H_2O/H_2/N_2$ atmosphere), the sintered chip was heat-treated by performing re-oxidation at 1000° C. for 3 hours under a nitrogen ($N_2$) atmosphere.

External electrodes were completed by terminating the sintered chip using a copper (Cu) paste and sintering the formed electrodes.

Capacitance, dissipation factors (DF), insulation resistance, temperature coefficients of capacitance (TCCs), resistance degradation behaviors according to a step voltage increase at a high temperature of 150° C., and the like, of proto-type multilayer ceramic capacitor (MLCC) samples completed as described above were evaluated.

The room-temperature capacitance and the dissipation factor of the multilayer ceramic capacitor (MLCC) were measured at 1 kHz and AC voltage of 0.2 V/μm using a LCR-meter.

Permittivity of the multilayer ceramic capacitor (MLCC) was calculated from the capacitance, a thickness of a dielectric layer, an area of the internal electrodes, and the number of stacked dielectric layers of the multilayer ceramic capacitor (MLCC).

Room temperature insulation resistance (IR) was measured after 60 seconds in a state in which ten samples each were taken and a DC voltage of 10 V/μm was applied thereto.

The temperature coefficient of capacitance (TCC) was measured in a temperature range from −55° C. to 150° C.

In a high-temperature IR boosting test, the resistance degradation behavior was measured while increasing the respective step voltages by 5 V/μm at 150° C., and a resistance value was measured every 5 seconds, wherein the time of a respective step was 10 minutes.

The high-temperature withstand voltage was derived from the high-temperature IR boosting test. Here, the high-temperature withstand voltage is defined as a voltage at which an IR may withstand $10^5 \Omega$ or more when the high-temperature withstand voltage was measured by applying the step voltage of DC 5 V/μm to a 3216 size chip at 150° C. for 10 minutes and continuously increasing the step voltage, wherein the 3216 size chip has 20 dielectric layers having a thickness of 7 μm after sintering.

In the dielectric material, a crystal grain in which a content of Ca was less than 2.5 mol % and a crystal grain in which a content of Ca was in a range of 4.0 to 12.0 mol % were referred to as first and second crystal grains, respectively.

An area ratio 100-a (%) of the first crystal grain and an area ratio a (%) of the second crystal grain were calculated by analyzing contents of Ca in 20 crystal grains using STEM/EDS. The content of Ca in one crystal grain was determined as an average value of 4 content values of Ca in respective points P1 to P4 as illustrated in FIG. 1.

The following Table 1 illustrates compositions of Experimental Examples, and Table 2 illustrates characteristics of proto-type multilayer ceramic capacitors (MLCCs) corresponding to the compositions illustrated in Table 1.

TABLE 1

| Sample | First Base Material Main Ingredient $(Ba_{1-x}Ca_x)TiO_3$ | | Second Base Material Main Ingredient $(Ba_{1-y}Ca_y)TiO_3$ | | Mixed Molar Ratio of First and Second Base Material Main Ingredients | | Average Size of First Base Material Crystal Grain (nm) | Average Size of Second Base Crystal Grain (nm) | Content (mole) of Each Additive Based on 100 Moles of Base Material Main Ingredient | | | | | |
|---|---|---|---|---|---|---|---|---|---|---|---|---|---|---|
| | | | | | | | | | 1st Accessory Ingredient | 2nd Accessory Ingredient | 3rd Accessory Ingredient | 4th Accessory Ingredient | | 5th Accessory Ingredient | 6th Accessory Ingredient |
| | Ba 1 − x | Ca x | Ba 1 − y | Ca y | First Base 1 − z | Second Base z | | | $MnO_2$ | $V_2O_5$ | $MgCO_3$ | $Y_2O_3$ | $BaCO_3$ | $CaCO_3$ | $CaZrO_3$ | $SiO_2$ |
| 1 | 1.000 | 0.000 | 0.96 | 0.04 | 0.4 | 0.6 | 430 | 240 | 0.2 | 0.1 | 0.05 | 0.75 | 2.2 | 0 | 1 | 1.25 |
| 2 | 1.000 | 0.000 | 0.96 | 0.04 | 0.4 | 0.6 | 385 | 310 | 0.2 | 0.1 | 0.05 | 0.75 | 2.2 | 0 | 1 | 1.25 |
| 3 | 1.000 | 0.000 | 0.96 | 0.04 | 0.4 | 0.6 | 385 | 240 | 0.2 | 0.1 | 0.05 | 0.75 | 2.2 | 0 | 1 | 1.25 |
| 4 | 1.000 | 0.000 | 0.96 | 0.04 | 0.4 | 0.6 | 385 | 170 | 0.2 | 0.1 | 0.05 | 0.75 | 2.2 | 0 | 1 | 1.25 |
| 5 | 1.000 | 0.000 | 0.96 | 0.04 | 0.4 | 0.6 | 385 | 140 | 0.2 | 0.1 | 0.05 | 0.75 | 2.2 | 0 | 1 | 1.25 |
| 6 | 1.000 | 0.000 | 0.96 | 0.04 | 0.4 | 0.6 | 385 | 110 | 0.2 | 0.1 | 0.05 | 0.75 | 2.2 | 0 | 1 | 1.25 |
| 7 | 1.000 | 0.000 | 0.96 | 0.04 | 0.4 | 0.6 | 290 | 240 | 0.2 | 0.1 | 0.05 | 0.75 | 2.2 | 0 | 1 | 1.25 |
| 8 | 1.000 | 0.000 | 0.96 | 0.04 | 0.4 | 0.6 | 290 | 170 | 0.2 | 0.1 | 0.05 | 0.75 | 2.2 | 0 | 1 | 1.25 |
| 9 | 1.000 | 0.000 | 0.96 | 0.04 | 0.4 | 0.6 | 290 | 140 | 0.2 | 0.1 | 0.05 | 0.75 | 2.2 | 0 | 1 | 1.25 |
| 10 | 1.000 | 0.000 | 0.96 | 0.04 | 0.4 | 0.6 | 290 | 110 | 0.2 | 0.1 | 0.05 | 0.75 | 2.2 | 0 | 1 | 1.25 |
| 11 | 1.000 | 0.000 | 0.96 | 0.04 | 0.4 | 0.6 | 240 | 180 | 0.2 | 0.1 | 0.05 | 0.75 | 2.2 | 0 | 1 | 1.25 |
| 12 | 1.000 | 0.000 | 0.96 | 0.04 | 0.4 | 0.6 | 240 | 140 | 0.2 | 0.1 | 0.05 | 0.75 | 2.2 | 0 | 1 | 1.25 |
| 13 | 1.000 | 0.000 | 0.96 | 0.04 | 0.4 | 0.6 | 240 | 110 | 0.2 | 0.1 | 0.05 | 0.75 | 2.2 | 0 | 1 | 1.25 |
| 14 | 1.000 | 0.000 | 0.925 | 0.075 | 0.4 | 0.6 | 430 | 240 | 0.2 | 0.1 | 0.05 | 0.75 | 2.2 | 0 | 1 | 1.25 |
| 15 | 1.000 | 0.000 | 0.925 | 0.075 | 0.4 | 0.6 | 385 | 310 | 0.2 | 0.1 | 0.05 | 0.75 | 2.2 | 0 | 1 | 1.25 |

TABLE 1-continued

| | First Base Material Main Ingredient $(Ba_{1-x}Ca_x)TiO_3$ | | Second Base Material Main Ingredient $(Ba_{1-y}Ca_y)TiO_3$ | | Mixed Molar Ratio of First and Second Base Material Main Ingredients | | Average Size of First Base Material Crystal Grain (nm) | Average Size of Second Base Material Crystal Grain (nm) | Content (mole) of Each Additive Based on 100 Moles of Base Material Main Ingredient | | | | | | | |
|---|---|---|---|---|---|---|---|---|---|---|---|---|---|---|---|---|
| | | | | | | | | | 1st Accessory Ingredient | | 2nd Accessory Ingredient | 3rd Accessory Ingredient | 4th Accessory Ingredient | | 5th Accessory Ingredient | 6th Accessory Ingredient |
| Sample | Ba 1−x | Ca x | Ba 1−y | Ca y | First Base Material 1−z | Second Base Material z | | | MnO2 | V2O5 | MgCO3 | Y2O3 | BaCO3 | CaCO3 | CaZrO3 | SiO2 |
| 16 | 1.000 | 0.000 | 0.925 | 0.075 | 0.4 | 0.6 | 385 | 240 | 0.2 | 0.1 | 0.05 | 0.75 | 2.2 | 0 | 1 | 1.25 |
| 17 | 1.000 | 0.000 | 0.925 | 0.075 | 0.4 | 0.6 | 385 | 170 | 0.2 | 0.1 | 0.05 | 0.75 | 2.2 | 0 | 1 | 1.25 |
| 18 | 1.000 | 0.000 | 0.925 | 0.075 | 0.4 | 0.6 | 385 | 140 | 0.2 | 0.1 | 0.05 | 0.75 | 2.2 | 0 | 1 | 1.25 |
| 19 | 1.000 | 0.000 | 0.925 | 0.075 | 0.4 | 0.6 | 385 | 110 | 0.2 | 0.1 | 0.05 | 0.75 | 2.2 | 0 | 1 | 1.25 |
| 20 | 1.000 | 0.000 | 0.925 | 0.075 | 0.4 | 0.6 | 290 | 240 | 0.2 | 0.1 | 0.05 | 0.75 | 2.2 | 0 | 1 | 1.25 |
| 21 | 1.000 | 0.000 | 0.925 | 0.075 | 0.4 | 0.6 | 290 | 170 | 0.2 | 0.1 | 0.05 | 0.75 | 2.2 | 0 | 1 | 1.25 |
| 22 | 1.000 | 0.000 | 0.925 | 0.075 | 0.4 | 0.6 | 290 | 140 | 0.2 | 0.1 | 0.05 | 0.75 | 2.2 | 0 | 1 | 1.25 |
| 23 | 1.000 | 0.000 | 0.925 | 0.075 | 0.4 | 0.6 | 290 | 110 | 0.2 | 0.1 | 0.05 | 0.75 | 2.2 | 0 | 1 | 1.25 |
| 24 | 1.000 | 0.000 | 0.925 | 0.075 | 0.4 | 0.6 | 240 | 180 | 0.2 | 0.1 | 0.05 | 0.75 | 2.2 | 0 | 1 | 1.25 |
| 25 | 1.000 | 0.000 | 0.925 | 0.075 | 0.4 | 0.6 | 240 | 140 | 0.2 | 0.1 | 0.05 | 0.75 | 2.2 | 0 | 1 | 1.25 |
| 26 | 1.000 | 0.000 | 0.925 | 0.075 | 0.4 | 0.6 | 240 | 110 | 0.2 | 0.1 | 0.05 | 0.75 | 2.2 | 0 | 1 | 1.25 |
| 27 | 1.000 | 0.000 | 0.88 | 0.12 | 0.4 | 0.6 | 430 | 240 | 0.2 | 0.1 | 0.05 | 0.75 | 2.2 | 0 | 1 | 1.25 |
| 28 | 1.000 | 0.000 | 0.88 | 0.12 | 0.4 | 0.6 | 385 | 310 | 0.2 | 0.1 | 0.05 | 0.75 | 2.2 | 0 | 1 | 1.25 |
| 29 | 1.000 | 0.000 | 0.88 | 0.12 | 0.4 | 0.6 | 385 | 240 | 0.2 | 0.1 | 0.05 | 0.75 | 2.2 | 0 | 1 | 1.25 |
| 30 | 1.000 | 0.000 | 0.88 | 0.12 | 0.4 | 0.6 | 385 | 170 | 0.2 | 0.1 | 0.05 | 0.75 | 2.2 | 0 | 1 | 1.25 |
| 31 | 1.000 | 0.000 | 0.88 | 0.12 | 0.4 | 0.6 | 385 | 140 | 0.2 | 0.1 | 0.05 | 0.75 | 2.2 | 0 | 1 | 1.25 |
| 32 | 1.000 | 0.000 | 0.88 | 0.12 | 0.4 | 0.6 | 385 | 110 | 0.2 | 0.1 | 0.05 | 0.75 | 2.2 | 0 | 1 | 1.25 |
| 33 | 1.000 | 0.000 | 0.88 | 0.12 | 0.4 | 0.6 | 290 | 240 | 0.2 | 0.1 | 0.05 | 0.75 | 2.2 | 0 | 1 | 1.25 |
| 34 | 1.000 | 0.000 | 0.88 | 0.12 | 0.4 | 0.6 | 290 | 170 | 0.2 | 0.1 | 0.05 | 0.75 | 2.2 | 0 | 1 | 1.25 |
| 35 | 1.000 | 0.000 | 0.88 | 0.12 | 0.4 | 0.6 | 290 | 140 | 0.2 | 0.1 | 0.05 | 0.75 | 2.2 | 0 | 1 | 1.25 |
| 36 | 1.000 | 0.000 | 0.88 | 0.12 | 0.4 | 0.6 | 290 | 110 | 0.2 | 0.1 | 0.05 | 0.75 | 2.2 | 0 | 1 | 1.25 |
| 37 | 1.000 | 0.000 | 0.88 | 0.12 | 0.4 | 0.6 | 240 | 180 | 0.2 | 0.1 | 0.05 | 0.75 | 2.2 | 0 | 1 | 1.25 |
| 38 | 1.000 | 0.000 | 0.88 | 0.12 | 0.4 | 0.6 | 240 | 140 | 0.2 | 0.1 | 0.05 | 0.75 | 2.2 | 0 | 1 | 1.25 |
| 39 | 1.000 | 0.000 | 0.88 | 0.12 | 0.4 | 0.6 | 240 | 110 | 0.2 | 0.1 | 0.05 | 0.75 | 2.2 | 0 | 1 | 1.25 |

TABLE 2

| Sample | Average Size of First Crystal Grain after Sintering ① | Average Size of Second Crystal Grain after Sintering ② | Ratio of Sizes of Crystal Grains ①/② | Room Temperature Permittivity | DF (%) | RC (ohmF) | TCC(%) @−55 | TCC(%) @125 | TCC(%) @150 | High-Temperature Withstand Voltage @150 [V/um] | Pore Ratio at Triple Point [%] | Judgment of Characteristics |
|---|---|---|---|---|---|---|---|---|---|---|---|---|
| 1 | 443.5 | 253.1 | 1.8 | 2615 | 7.9 | 1890 | −14.8 | −8.9 | −20.1 | 60 | 25 | x |
| 2 | 401.2 | 333.6 | 1.2 | 2530 | 7.6 | 1654 | −13.3 | −7.5 | −18.9 | 60 | 32 | Δ |
| 3 | 403.6 | 249.5 | 1.6 | 2323 | 5.9 | 1732 | −12.7 | 3.4 | −13.5 | 70 | 20 | ○ |
| 4 | 400.8 | 184.2 | 2.2 | 2289 | 5.4 | 1720 | −13.5 | 2.2 | −13.1 | 65 | 18 | ○ |
| 5 | 401.1 | 152.1 | 2.6 | 2180 | 5.2 | 1053 | −14.7 | −6.5 | −18.7 | 45 | 44 | x |
| 6 | 398.7 | 120.6 | 3.3 | 2154 | 5.1 | 916 | −15.1 | −5.4 | −15.4 | 50 | 33 | Δ |
| 7 | 297.9 | 251.1 | 1.2 | 2207 | 5.3 | 894 | −14.6 | −7.1 | −17.8 | 45 | 39 | x |
| 8 | 301.5 | 183.2 | 1.6 | 2140 | 4.9 | 1652 | −13.3 | −1.2 | −12.8 | 70 | 14 | ○ |
| 9 | 300.4 | 155.1 | 1.9 | 2100 | 4.9 | 1563 | −12.9 | −1.8 | −12.7 | 70 | 16 | ○ |
| 10 | 304.1 | 121.4 | 2.5 | 1980 | 4.6 | 1189 | −14.8 | −5.4 | −14.8 | 45 | 41 | x |
| 11 | 251.1 | 201.7 | 1.2 | 1826 | 4.1 | 980 | −15 | −4.3 | −13.9 | 45 | 40 | x |
| 12 | 252.3 | 152.3 | 1.7 | 1978 | 4.5 | 1497 | −13.7 | −1.4 | −12.5 | 65 | 17 | ○ |
| 13 | 250.4 | 121.1 | 2.1 | 1720 | 3.8 | 896 | −15.7 | −4.9 | −12.7 | 50 | 35 | x |
| 14 | 434.6 | 252.2 | 1.7 | 2602 | 7.8 | 1870 | −14.0 | −8.8 | −21.1 | 60 | 22 | x |
| 15 | 404.2 | 303.6 | 1.3 | 2510 | 7.4 | 1650 | −13.3 | −8.5 | −19.9 | 60 | 36 | Δ |
| 16 | 401.3 | 252.6 | 1.6 | 2312 | 5.8 | 1742 | −12.9 | 3.2 | −13.1 | 70 | 22 | ○ |
| 17 | 401.2 | 182.2 | 2.2 | 2300 | 5.4 | 1728 | −13.4 | 2.2 | −12.8 | 70 | 18 | ○ |
| 18 | 400.8 | 152.8 | 2.6 | 2192 | 5.2 | 1062 | −14.5 | −6.2 | −18.9 | 45 | 45 | x |
| 19 | 400.7 | 122.2 | 3.3 | 2142 | 5.2 | 896 | −15.7 | −7.4 | −15.6 | 50 | 32 | Δ |
| 20 | 302.9 | 250.1 | 1.2 | 2183 | 5.4 | 890 | −14.2 | −8.1 | −17.9 | 45 | 40 | x |
| 21 | 301.5 | 182.9 | 1.6 | 2147 | 5.1 | 1642 | −13.3 | −1.5 | −13.1 | 70 | 15 | ○ |
| 22 | 303.2 | 154.2 | 2.0 | 2133 | 5.0 | 1568 | −13.1 | −1.4 | −12.8 | 70 | 16 | ○ |
| 23 | 299.1 | 124.1 | 2.4 | 1980 | 4.7 | 1179 | −13.8 | −5.4 | −14.3 | 45 | 42 | x |
| 24 | 254.2 | 251.7 | 1.0 | 1812 | 4.3 | 978 | −15.1 | −4.4 | −13.6 | 45 | 44 | x |
| 25 | 250.3 | 151.8 | 1.6 | 1968 | 4.4 | 1467 | −12.8 | −1.3 | −12.8 | 65 | 16 | ○ |
| 26 | 252.4 | 120.1 | 2.1 | 1635 | 3.7 | 901 | −15.7 | −4.9 | −13.7 | 50 | 33 | x |
| 27 | 435.4 | 251.2 | 1.7 | 2613 | 7.5 | 1887 | −14.7 | −8.7 | −22.1 | 55 | 24 | x |

TABLE 2-continued

| | Average Size of First Crystal Grain after Sintering ① | Average Size of Second Crystal Grain after Sintering ② | Ratio of Sizes of Crystal Grains ①/② | Room Temperature Permittivity | DF (%) | RC (ohmF) | TCC(%) @-55 | TCC(%) @125 | TCC(%) @150 | High-Temperature Withstand Voltage @150 [V/um] | Pore Ratio at Triple Point [%] | Judgment of Characteristics |
|---|---|---|---|---|---|---|---|---|---|---|---|---|
| 28 | 403.2 | 302.6 | 1.3 | 2534 | 7.5 | 1655 | −13.2 | −7.4 | −19.4 | 60 | 36 | Δ |
| 29 | 400.3 | 252.8 | 1.6 | 2333 | 5.8 | 1752 | −12.8 | 3.8 | −13.3 | 70 | 20 | o |
| 30 | 399.2 | 181.3 | 2.2 | 2287 | 5.5 | 1724 | −13.2 | 2.6 | −13.2 | 70 | 17 | o |
| 31 | 400.3 | 151.2 | 2.6 | 2182 | 5.2 | 1043 | −14.8 | −6.6 | −18.5 | 40 | 42 | x |
| 32 | 401.7 | 120.2 | 3.3 | 2156 | 5.1 | 911 | −15.2 | −5.6 | −15.9 | 55 | 35 | Δ |
| 33 | 305.5 | 253.1 | 1.2 | 2212 | 5.4 | 891 | −14.8 | −7.7 | −17.1 | 45 | 39 | x |
| 34 | 302.2 | 182.9 | 1.7 | 2145 | 5.1 | 1653 | −13.5 | −1.4 | −12.6 | 70 | 15 | o |
| 35 | 303.9 | 154.6 | 2.0 | 2109 | 4.9 | 1572 | −13.1 | −2.1 | −12.8 | 70 | 17 | o |
| 36 | 303.1 | 124.7 | 2.4 | 1987 | 4.7 | 1192 | −14.8 | −5.4 | −14.9 | 45 | 40 | x |
| 37 | 251.2 | 252.2 | 1.0 | 1816 | 4.1 | 982 | −15.1 | −4.4 | −14.9 | 45 | 41 | x |
| 38 | 251.3 | 153.8 | 1.6 | 1989 | 4.4 | 1501 | −13.7 | −1.4 | −12.8 | 70 | 17 | o |
| 39 | 249.4 | 121.1 | 2.1 | 1711 | 3.9 | 897 | −15.2 | −4.3 | −12.1 | 50 | 33 | x |

Pore ratio (%) at triple point=(the number of pores having a long axis length of 20 nm or more)/(the total number of triple points)×100

Samples 1 to 39 of Table 1 illustrate samples depending on a content (x=0) of Ca in $(Ba_{1-x}Ca_x)TiO_3$ (first base material powder), a content y of Ca in $(Ba_{1-y}Ca_y)TiO_3$ (second base material powder), and a change in sizes of the first and second base material powders under the conditions at which a sum of contents of variable-valence elements (Mn and V) (the first accessory ingredient) was fixed to 0.3 mol, a content Mg (second accessory ingredient) was fixed to 0.05 mol, a content of a rare earth element Y (third accessory ingredient) was fixed to 0.4 mol, a sum of contents of Ba and Ca (fourth accessory ingredient) was fixed to 2.2 mol, a content of $CaZrO_3$ (fifth accessory ingredient) was fixed to 1 mol, and a content of Si (sixth accessory ingredient) was fixed to 1.25 mol, based on 100 mol of $(1-z)(Ba_{1-x}Ca_x)TiO_3 + z(Ba_{1-y}Ca_y)TiO_3$ (base material mixed powder), and a ratio of the first base material powder and the second base material powder was fixed to 0.4:0.6. In addition, samples 1 to 39 of Table 2 illustrate characteristics of samples corresponding to the samples 1 to 39 of Table 1.

The first base material powder contained the first base material main ingredient, and the second base material powder contained the second base material main ingredient.

The mixed molar ratio of the first and second base material powders was used as the same meaning as a mixed molar ratio of the first and second base material main ingredients.

Among samples 1 to 13 in which the content x of Ca in $(Ba_{1-x}Ca_x)TiO_3$ (first base material powder) was 0 and the content y of Ca in $(Ba_{1-y}Ca_y)TiO_3$ (second base material powder) was 0.04, in sample 1 in which a ratio of an average size of first base material crystal grains after sintering to an average size of second base material crystal grains was 1.8, a pore fraction at a triple point was relatively low, and high-temperature withstand voltage characteristics were excellent, but since the base material itself had a large size, room-temperature permittivity was high, and thus TCC at a high temperature (150° C.) did not satisfy X8R standard, and a DF was increased to be 7.9% or more.

In cases (samples 3, 4, 8, and 9) in which the ratio of the average size of the first base material crystal grain after sintering to the average size of the second base material crystal grain was in a range of 1.6 to 2.2, since the pore ratio at the triple point was 20% or less, and thus compactness after sintering was high, high-temperature withstand voltage characteristics of 65 V/μm or more may be implemented, TCC at a high temperature (150° C.) may satisfy the X8R standard, and characteristics such as a low DF of 6.0% or less and a RC value of 1500 or more may be implemented.

In cases (samples 5 to 7, 10, 11, and 13) in which the ratio of the average size of the first base material crystal grain after sintering to the average size of the second base material crystal grain was in a range of 1.5 or less or 2.3 or more, since the pore ratio at the triple point was 30% or more, compactness was low, and high-temperature withstand voltage characteristics were deteriorated.

Samples 14 to 26 indicate samples in which the content x of Ca in $(Ba_{1-x}Ca_x)TiO_3$ (first base material powder) was 0 and the content y of Ca in $(Ba_{1-y}Ca_y)TiO_3$ (second base material powder) was 0.075. In cases in which the ratio of the average size of the first base material crystal grain after sintering to the average size of the second base material crystal grain was in a range of 1.6 to 2.2, similar to behaviors of samples 1 to 13, a pore fraction at the triple point was low (22% or less), high-temperature withstand voltage characteristics were excellent, TCC at a high temperature (150° C.) satisfied the X8R standard, and excellent characteristics such as a DF of 6.0% or less and a RC value of 1960 or more may be implemented.

Samples 27 to 39 indicate samples in which the content x of Ca in $(Ba_{1-x}Ca_x)TiO_3$ (first base material powder) was 0 and the content y of Ca in $(Ba_{1-y}Ca_y)TiO_3$ (second base material powder) was 0.12. In cases in which the ratio of the average size of the first base material crystal grain after sintering to the average size of the second base material crystal grain was in a range of 1.6 to 2.2, similar to behaviors of samples 1 to 13, a pore fraction at the triple point was low (20% or less), high-temperature withstand voltage characteristics were excellent, TCC at a high temperature (150° C.) satisfied the X8R standard, and excellent characteristics such as DF of 6.0% or less and a RC value of 1960 or more may be implemented.

As the results of samples 1 to 39, it may be appreciated that a fine structure capable of implementing desired characteristics in the present disclosure is a fine structure in which a ratio of ①/② is in a range of 1.6 to 2.2 in which ① is an average size of a first crystal grain after sintering and ② is an average size of a second crystal grain after sintering.

In the fine structure as described above, the pore fraction at the triple point may be low (20% or less), the high-temperature withstand voltage characteristics may be excellent, and when the content x of Ca in $(Ba_{1-x}Ca_x)TiO_3$ (first base material powder) was 0, the content y of Ca in $(Ba_{1-y}Ca_y)TiO_3$ (second base material powder) may satisfy $0.04 \leq y \leq 0.12$.

As set forth above, according to exemplary embodiments in the present disclosure, the dielectric ceramic composition and the dielectric material capable of satisfying the X8R temperature characteristics and implementing excellent high-temperature withstand voltage characteristics, and the multilayer ceramic capacitor containing the same, may be implemented.

While exemplary embodiments have been shown and described above, it will be apparent to those skilled in the art that modifications and variations could be made without departing from the scope of the present invention as defined by the appended claims.

What is claimed is:

1. A dielectric ceramic composition comprising a barium titanate based base material main ingredient and an accessory ingredient,
wherein in a fine sintered structure of the base material main ingredient, crystal grains in which a content of Ca is less than 2.5 mol % are first crystal grains, crystal grains in which the content of Ca is 4.0 to 12.0 mol % are second crystal grains, and a ratio of an average size of the first crystal grains to an average size of the second crystal grains is in a range of 1.6 to 2.2.

2. The dielectric ceramic composition of claim 1, wherein an area of the crystal grains of the base material main ingredient satisfying the condition that the ratio of the average size of the first crystal grains to the average size of the second crystal grains is in a range of 1.6 to 2.2 is 80% or more of an entire area (100%) of the crystal grains.

3. The dielectric ceramic composition of claim 1, wherein the average size of the first crystal grains is 200 nm to 450 nm, and the average size of the second crystal grains is 120 nm to 350 nm.

4. The dielectric ceramic composition of claim 3, wherein the average size of the first crystal grains is greater than the average size of the second crystal grains.

5. The dielectric ceramic composition of claim 1, wherein the accessory ingredient includes:
a first accessory ingredient containing one or more selected from the group consisting of oxides and carbonates of one or more variable-valence acceptor elements among Mn, V, Cr, Fe, Ni, Co, Cu, and Zn;
a second accessory ingredient containing one or more of oxides and carbonates of fixed-valence acceptor elements including Mg;
a third accessory ingredient containing one or more selected from the group consisting of oxides and carbonates of one or more elements among Y, Dy, Ho, Sm, Gd, Er, La, Ce, and Nd;
a fourth accessory ingredient containing one or more selected from the group consisting of oxides and carbonates of one or more elements of Ba and Ca;
a fifth accessory ingredient containing $CaZrO_3$; and
a sixth accessory ingredient containing one or more selected from the group consisting of oxides of Si, carbonates of Si, and glass containing Si.

6. The dielectric ceramic composition of claim 5, wherein a sum of contents of one or more variable-valence acceptor elements among Mn, V, Cr, Fe, Ni, Co, Cu, and Zn contained in the first accessory ingredient being 0.1 to 2.0 parts by mole, based on 100 parts by mole of the base material main ingredient.

7. The dielectric ceramic composition of claim 5, wherein a content of the fixed-valence acceptor elements including Mg contained in the second accessory ingredient being 2.0 parts by mole or less, based on 100 parts by mole of the base material main ingredient.

8. The dielectric ceramic composition of claim 5, wherein a sum of contents of one or more elements among Y, Dy, Ho, Sm, Gd, Er, La, Ce, and Nd contained in the third accessory ingredient being 0.2 to 5.0 parts by mole, based on 100 parts by mole of the base material main ingredient.

9. The dielectric ceramic composition of claim 5, wherein a sum of contents of one or more elements of Ba and Ca contained in the fourth accessory ingredient being 0.72 to 7.68 parts by mole, based on 100 parts by mole of the base material main ingredient.

10. The dielectric ceramic composition of claim 5, wherein a content (based on Ca and Zr) of $CaZrO_3$ being 3 parts by mole or less, based on 100 parts by mole of the base material main ingredient.

11. The dielectric ceramic composition of claim 5, wherein a content of Si contained in the sixth accessory ingredient being 0.5 to 3.0 parts by mole, based on 100 parts by mole of the base material main ingredient.

12. The dielectric ceramic composition of claim 5, wherein:
a sum of contents of one or more variable-valence acceptor elements among Mn, V, Cr, Fe, Ni, Co, Cu, and Zn contained in the first accessory ingredient being 0.1 to 2.0 parts by mole, based on 100 parts by mole of the base material main ingredient, a content of the fixed-valence acceptor elements including Mg contained in the second accessory ingredient being 2.0 parts by mole or less, based on 100 parts by mole of the base material main ingredient,
a content of the fixed-valence acceptor elements including Mg contained in the second accessory ingredient being 2.0 parts by mole or less, based on 100 parts by mole of the base material main ingredient,
a sum of contents of one or more elements among Y, Dy, Ho, Sm, Gd, Er, La, Ce, and Nd contained in the third accessory ingredient being 0.2 to 5.0 parts by mole, based on 100 parts by mole of the base material main ingredient,
a sum of contents of one or more elements of Ba and Ca contained in the fourth accessory ingredient being 0.72 to 7.68 parts by mole, based on 100 parts by mole of the base material main ingredient,
a content (based on Ca and Zr) of $CaZrO_3$ being 3 parts by mole or less, based on 100 parts by mole of the base material main ingredient, and
a content of Si contained in the sixth accessory ingredient being 0.5 to 3.0 parts by mole, based on 100 parts by mole of the base material main ingredient.

13. The dielectric ceramic composition of claim 1, wherein an area ratio of a pore at a triple point where three crystal grains meet among the crystal grains is equal to or less than 20% of an entire area of the crystal grains.

14. The dielectric ceramic composition of claim 1, wherein the crystal grains in which the content of Ca is less than 2.0 mol % are the first crystal grains.

15. The dielectric ceramic composition of claim 1, wherein the first crystal grains are $BaTiO_3$.

16. A multilayer ceramic capacitor comprising:
a ceramic body in which sintered dielectric layers and internal electrodes are alternately stacked; and external electrodes formed on an outer surface of the ceramic body and electrically connected to the internal electrodes, wherein in a fine structure of the sintered dielectric layer, crystal grains in which a content of Ca is less than 2.5 mol % are first crystal grains, crystal grains in which the content of Ca is 4.0 to 12.0 mol % are second crystal grains, and a ratio of an average size of the first crystal grains to an average size of the second crystal grains is in a range of 1.6 to 2.2.

17. The multilayer ceramic capacitor of claim 16, wherein an area of the crystal grains satisfying the condition that the ratio of the average size of the first crystal grains to the average size of the second crystal grains is in a range of 1.6 to 2.2 is 80% or more of an entire area (100%) of the crystal grains.

18. The multilayer ceramic capacitor of claim 16, wherein the average size of the first crystal grains is 200 to 450 nm, and the average size of the second crystal grains is 120 to 350 nm.

19. The multilayer ceramic capacitor of claim 18, wherein the average size of the first crystal grains is greater than the average size of the second crystal grains.

20. The multilayer ceramic capacitor of claim 16, wherein the sintered dielectric layer is formed of a dielectric ceramic composition containing a barium titanate based base material main ingredient and an accessory ingredient, the accessory ingredient including: at least one of a first accessory ingredient containing one or more selected from the group consisting of oxides and carbonates of one or more variable-valence acceptor elements among Mn, V, Cr, Fe, Ni, Co, Cu, and Zn; a second accessory ingredient containing one or more of oxides and carbonates of fixed-valence acceptor elements including Mg; a third accessory ingredient containing one or more selected from the group consisting of oxides and carbonates of one or more elements among Y, Dy, Ho, Sm, Gd, Er, La, Ce, and Nd; a fourth accessory ingredient containing one or more selected from the group consisting of oxides and carbonates of one or more elements of Ba and Ca; a fifth accessory ingredient containing $CaZrO_3$; and a sixth accessory ingredient containing one or more selected from the group consisting of oxides of Si, carbonates of Si, and glass containing Si.

21. The multilayer ceramic capacitor of claim 20, wherein a sum of contents of one or more variable-valence acceptor elements among Mn, V, Cr, Fe, Ni, Co, Cu, and Zn contained in the first accessory ingredient being 0.1 to 2.0 parts by mole, based on 100 parts by mole of the base material main ingredient.

22. The multilayer ceramic capacitor of claim 20, wherein the accessory ingredient includes the second accessory ingredient containing one or more of the oxides and the carbonates of the fixed-valence acceptor elements including Mg, a content of the fixed-valence acceptor elements including Mg contained in the second accessory ingredient being 2.0 parts by mole or less, based on 100 parts by mole of the base material main ingredient.

23. The multilayer ceramic capacitor of claim 20, wherein a sum of contents of one or more elements among Y, Dy, Ho, Sm, Gd, Er, La, Ce, and Nd contained in the third accessory ingredient being 0.2 to 5.0 parts by mole, based on 100 parts by mole of the base material main ingredient.

24. The multilayer ceramic capacitor of claim 20, wherein a sum of contents of one or more elements of Ba and Ca contained in the fourth accessory ingredient being 0.72 to 7.68 parts by mole, based on 100 parts by mole of the base material main ingredient.

25. The multilayer ceramic capacitor of claim 20, wherein a content (based on Ca and Zr) of $CaZrO_3$ being 3 parts by mole or less, based on 100 parts by mole of the base material main ingredient.

26. The multilayer ceramic capacitor of claim 20, wherein a content of Si contained in the sixth accessory ingredient being 0.5 to 3.0 parts by mole, based on 100 parts by mole of the base material main ingredient.

27. The multilayer ceramic capacitor of claim 20, wherein:

a sum of contents of one or more variable-valence acceptor elements among Mn, V, Cr, Fe, Ni, Co, Cu, and Zn contained in the first accessory ingredient being 0.1 to 2.0 parts by mole, based on 100 parts by mole of the base material main ingredient, a content of the fixed-valence acceptor elements including Mg contained in the second accessory ingredient being 2.0 parts by mole or less, based on 100 parts by mole of the base material main ingredient, a content of the fixed-valence acceptor elements including Mg contained in the second accessory ingredient being 2.0 parts by mole or less, based on 100 parts by mole of the base material main ingredient, a sum of contents of one or more elements among Y, Dy, Ho, Sm, Gd, Er, La, Ce, and Nd contained in the third accessory ingredient being 0.2 to 5.0 parts by mole, based on 100 parts by mole of the base material main ingredient, a sum of contents of one or more elements of Ba and Ca contained in the fourth accessory ingredient being 0.72 to 7.68 parts by mole, based on 100 parts by mole of the base material main ingredient, a content (based on Ca and Zr) of $CaZrO_3$ being 3 parts by mole or less, based on 100 parts by mole of the base material main ingredient, and a content of Si contained in the sixth accessory ingredient being 0.5 to 3.0 parts by mole, based on 100 parts by mole of the base material main ingredient.

28. The multilayer ceramic capacitor of claim 16, wherein an area ratio of a pore at a triple point where three crystal grains meet among the crystal grains is equal to or less than 20% of an entire area of the crystal grains.

29. A dielectric ceramic composition comprising:

a base material main ingredient power including $(Ba_{1-x}Ca_x)TiO_3$ ($x \leq 0.02$) powder and $(Ba_{1-y}Ca_y)TiO_3$ ($0.04 \leq y \leq 0.12$) powder; and an accessory ingredient includes: a first accessory ingredient containing one or more selected from the group consisting of oxides and carbonates of one or more variable-valence acceptor elements among Mn, V, Cr, Fe, Ni, Co, Cu, and Zn; a second accessory ingredient containing one or more of oxides and carbonates of fixed-valence acceptor elements including Mg; a third accessory ingredient containing one or more selected from the group consisting of oxides and carbonates of one or more elements among Y, Dy, Ho, Sm, Gd, Er, La, Ce, and Nd; a fourth accessory ingredient containing one or more selected from the group consisting of oxides and carbonates of one or more elements of Ba and Ca; a fifth accessory ingredient containing $CaZrO_3$; and a sixth accessory ingredient containing one or more selected from the group consisting of oxides of Si, carbonates of Si, and glass containing Si.

30. The dielectric ceramic composition of claim 29, wherein:
- a sum of contents of one or more variable-valence acceptor elements among Mn, V, Cr, Fe, Ni, Co, Cu, and Zn contained in the first accessory ingredient being 0.1 to 2.0 parts by mole, based on 100 parts by mole of the base material main ingredient, a content of the fixed-valence acceptor elements including Mg contained in the second accessory ingredient being 2.0 parts by mole or less, based on 100 parts by mole of the base material main ingredient,
- a content of the fixed-valence acceptor elements including Mg contained in the second accessory ingredient being 2.0 parts by mole or less, based on 100 parts by mole of the base material main ingredient,
- a sum of contents of one or more elements among Y, Dy, Ho, Sm, Gd, Er, La, Ce, and Nd contained in the third accessory ingredient being 0.2 to 5.0 parts by mole, based on 100 parts by mole of the base material main ingredient,
- a sum of contents of one or more elements of Ba and Ca contained in the fourth accessory ingredient being 0.72 to 7.68 parts by mole, based on 100 parts by mole of the base material main ingredient,
- a content (based on Ca and Zr) of $CaZrO_3$ being 3 parts by mole or less, based on 100 parts by mole of the base material main ingredient, and
- a content of Si contained in the sixth accessory ingredient being 0.5 to 3.0 parts by mole, based on 100 parts by mole of the base material main ingredient.

31. The dielectric ceramic composition of claim 29, further comprising zirconia balls, ethanol, and toluene.

32. The dielectric ceramic composition of claim 29, wherein the $(Ba_{1-x}Ca_x)TiO_3$ ($x \leq 0.02$) powder has an average particle size of 300 nm.

33. A dielectric material formed by sintering the dielectric ceramic composition of claim 29.

* * * * *